United States Patent
Martini et al.

(10) Patent No.: US 9,746,063 B2
(45) Date of Patent: Aug. 29, 2017

(54) DIFFERENTIAL

(71) Applicant: Schaeffler Technologies AG & Co. KG, Herzogenaurach (DE)

(72) Inventors: Harald Martini, Herzogenaurach (DE); Thorsten Biermann, Wachenroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 41 days.

(21) Appl. No.: 14/784,350

(22) PCT Filed: Mar. 4, 2014

(86) PCT No.: PCT/DE2014/200105
§ 371 (c)(1),
(2) Date: Oct. 14, 2015

(87) PCT Pub. No.: WO2014/169910
PCT Pub. Date: Oct. 23, 2014

(65) Prior Publication Data
US 2016/0061307 A1 Mar. 3, 2016

(30) Foreign Application Priority Data
Apr. 16, 2013 (DE) .......... 10 2013 206 757

(51) Int. Cl.
*F16H 48/22* (2006.01)
*F16H 48/30* (2012.01)
(Continued)

(52) U.S. Cl.
CPC ............ *F16H 48/22* (2013.01); *F16H 48/06* (2013.01); *F16H 48/28* (2013.01); *F16H 48/30* (2013.01); *F16H 2048/207* (2013.01)

(58) Field of Classification Search
CPC ................................. F16H 2048/207
See application file for complete search history.

(56) References Cited

U.S. PATENT DOCUMENTS

| 4,679,463 A | 7/1987 | Ozaki et al. |
| 5,156,578 A * | 10/1992 | Hirota ............... B60K 17/3462 |
| | | 475/150 |

(Continued)

FOREIGN PATENT DOCUMENTS

| DE | 1630361 | 9/1967 |
| DE | 3913487 | 11/1989 |
| EP | 0340451 | 11/1989 |

*Primary Examiner* — Justin Holmes
*Assistant Examiner* — Timothy M Hannon
(74) *Attorney, Agent, or Firm* — Simpson & Simpson, PLLC

(57) ABSTRACT

A differential, including: a gear housing; an epicyclic housing which is mounted in the gear housing in a manner allowing rotation about a gear axis; a planet carrier arranged in the epicyclic housing in a manner allowing rotation; a first output sun gear; a second output sun gear; a planetary arrangement, accommodated in the planet carrier, coupling the output sun gears in a manner allowing opposite rotation; a brake device generating a bridging torque which places a load on relative rotation of the first and second output sun gears, according to a magnitude of an axial force applied to the brake device; and an actuating mechanism for the purpose of generating said axial force applied to the brake device. The actuating mechanism is designed in such a manner that the first bridging torque generated by the brake device increases as a rotary drive torque applied to the epicyclic housing increases.

11 Claims, 1 Drawing Sheet

(51) Int. Cl.
*F16H 48/06* (2006.01)
*F16H 48/28* (2012.01)
*F16H 48/20* (2012.01)

(56) References Cited

U.S. PATENT DOCUMENTS

| 5,326,333 | A | 7/1994 | Niizawa et al. |
| 7,083,541 | B2 * | 8/2006 | Pecnik ............... B60K 23/0808 475/221 |

* cited by examiner

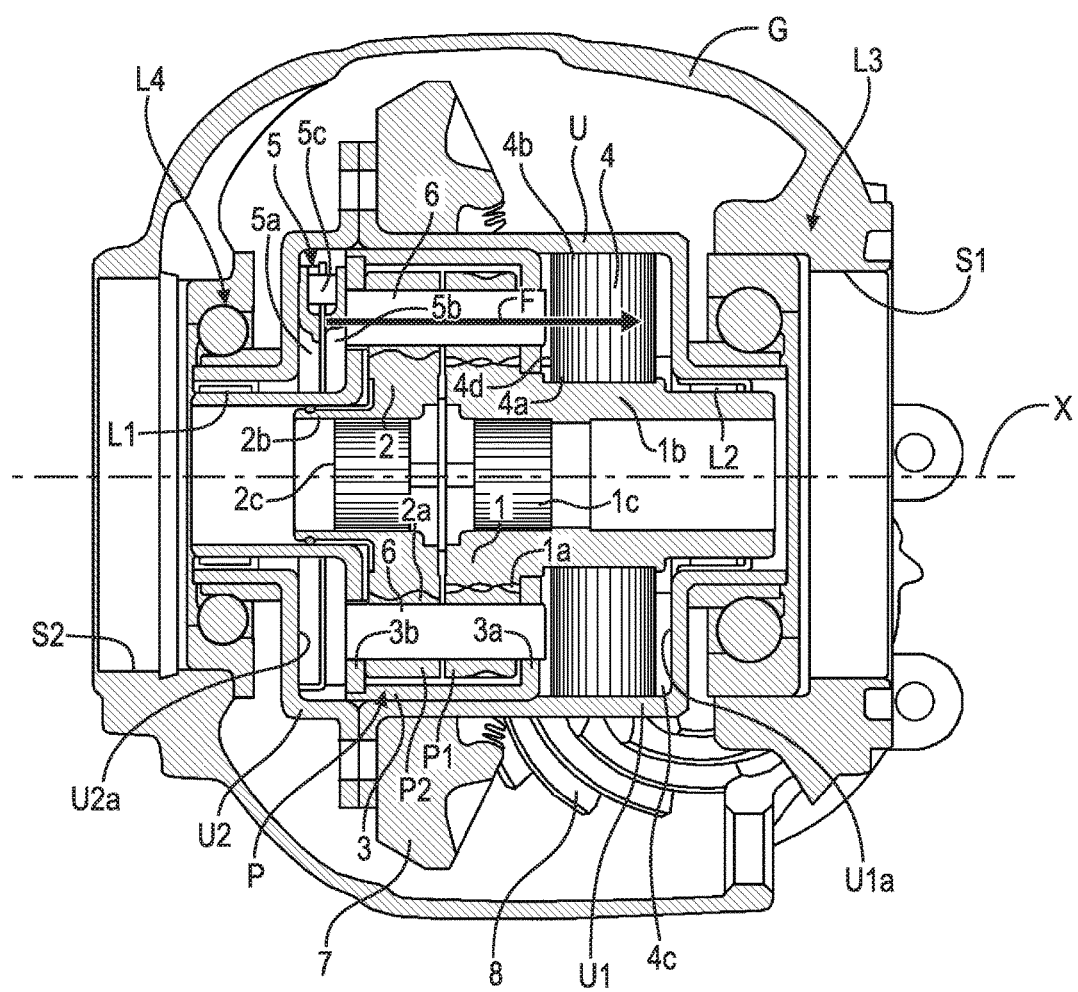

DIFFERENTIAL

CROSS-REFERENCE TO RELATED APPLICATIONS

The present application is the U.S. National Stage Application pursuant to 35 U.S.C. §371 of International Application No. PCT/DE2014/200105, filed Mar. 4, 2014, which application claims priority from German Patent Application No. 10 2013 206 757.7, filed Apr. 16, 2013, which applications are incorporated herein by reference in their entireties.

TECHNICAL HELD

The present disclosure broadly describes a differential having a gear housing, an epicyclic housing which is mounted in the gear housing about a gear axis in a manner allowing rotation, a planet carrier mounted in the epicyclic housing, and a first and a second output sun gear arranged in the planet carrier coaxially to the gear axis. The drive power applied to the epicyclic housing by this differential is divided to the first and the second output sun gears, with a temporary superposition of the coupling torque generated as a friction torque.

BACKGROUND

Differentials are generally designed as planetary gears, and predominantly serve the purpose of branching or dividing an input power, which is conveyed via a power input, to two driveshafts. Differentials are most commonly used in the construction of automobiles, as so-called axle differentials. In this case, drive power delivered by a drive motor is distributed by the differential to wheel driveshafts of driven wheels. The two wheel driveshafts leading to the wheels in this case are each driven with the same rotary torque—that is, in balance. When the vehicle is moving straight ahead, both wheels rotate at the same speed. In a curve, the rotation speeds of the wheels differ from each other. The axle differential enables this difference in rotation speed. The rotation speeds can vary freely; only the average value of the two speeds is unchanged. In the past, these differentials were largely designed as so-called bevel gear differentials. In addition to this design, differentials are also constructed in the form of so-called spur gear differentials. In the case of spur gear differentials, the output sun gears which function as the power output are typically coupled together via at least two planetary wheels which engage with each other and are thereby coupled into a gearing in a manner allowing rotation in opposite directions, and are designed as spur gears.

A bevel gear compensation gearing for a motor vehicle is known from DE 1 630 361 A1, equipped with a locking mechanism which makes it possible for each of the output sun gears to be fixed by a friction fit in a planet carrier, the same carrying the sun gears, via brake disks. The locking mechanism is designed in such a manner that it provides a strong locking function when unloaded, but this locking function is released as the rotary drive torque increases.

A differential for a motor vehicle is known from U.S. Pat. No. 5,326,333, having an epicyclic housing which carries a crown gear and is driven via the same. The epicyclic housing forms a ring gear toothing which is the rolling path of a first planetary arrangement. This planetary arrangement is mounted in a planet carrier which has a connector segment for a first wheel driveshaft. The planet carrier also seats a second planetary arrangement which engages on one end thereof with the first planetary arrangement, and meshes on the other end with a sun gear which has a connector segment for a second wheel driveshaft. This second sun gear can be fixed by braking via a disk pack on the planet carrier. When this braking occurs, an axial force is applied to the planet carrier, whereby the planet carrier is also axially displaced. This in turn is the result of a selective, electromagnetically-controlled braking of a support ring of a ball-ramp mechanism which revolves together with the planet carrier.

A differential is known from U.S. Pat. No. 4,679,463, wherein the locking function thereof can be adjustably modified via an annular piston mechanism. This differential has an epicyclic housing which is accommodated in a gear housing and which carries a crown gear. The epicyclic housing is driven via this crown gear. The planet carrier of a bevel gear differential is mounted in a torque-proof manner in the epicyclic housing. This bevel gear differential has a first and a second output wheel. These two output wheels can be braked by axially loading a first and a second disk clutch pack on the epicyclic housing. The annular piston mechanism is arranged fixed on the gear housing. The axial force generated by this annular piston mechanism, which does not revolve with the other components, is transmitted to the revolving region in cooperation with an axial cylindrical roller bearing which is coaxial to the gear axis.

SUMMARY

The present disclosure describes a differential, having: a gear housing, an epicyclic housing which is mounted in the gear housing in a manner allowing rotation about a gear axis, a planet carrier arranged in the epicyclic housing coaxially to the gear axis, a first output sun gear, a second output sun gear, a planetary arrangement, accommodated in the planet carrier, for the purpose of coupling the two output sun gears in a manner allowing opposite rotation, a brake device for the purpose of generating a bridging torque which places a load on the relative rotation of the output sun gears, according to the magnitude of an axial force applied to the brake device, and an actuating mechanism for the purpose of generating said axial force applied to the brake device. The actuating mechanism is designed in such a manner that the bridging torque generated by the brake device increases as the rotary drive torque applied to the epicyclic housing increases.

In this way, it is advantageously possible to create a differential wherein the output sun gears are increasing coupled together by a friction fit as the rotary drive torque increases, via an integrated brake device. As a result, particularly when a vehicle accelerates quickly, the configuration achieves stable directional stability of a corresponding vehicle.

According to an example embodiment, the differential is constructed in such a manner that the brake device is formed by a brake disk pack which couples at least one of the output sun gears to the epicyclic housing or the planet carrier with a friction fit. In this way, it is advantageously possible to couple the two output sun gears with a friction fit via the brake disk pack, on the one hand, and on the other hand to implement a transmission of rotary torque between the output sun gears and the epicyclic housing and/or the planet carrier via said output sun gears via the bridging torque generated by the brake disk pack.

In an example embodiment, the actuating mechanism itself is designed in such a manner that the maximum bridging torque which can be realized is limited to a maximum locking torque value determined by the construction.

Particularly in combination with this design, the actuating mechanism is further advantageously designed in such a manner that the bridging torque does not exceed a certain percent fraction of the primary drive torque. As such, the actuating mechanism can be designed, for example, in such a manner that the bridging torque which is set, for example in each case is 12% to 18%, and for example 15% of the primary drive torque applied to the epicyclic housing.

The actuating mechanism can be designed in such a manner that it is only active when a prespecified minimum primary drive torque is reached. This can be achieved by the actuating mechanism having return means with a return force which is only overcome at a prespecified minimum primary drive torque. The return means in this case can be designed in such a manner that a load is only applied to the brake disk pack, and the bridging torque is only generated, when a primary drive torque is reached which makes this practical from the perspective of driving dynamics.

In an example embodiment, the actuating mechanism is incorporated into the kinematics of the gear device in such a manner that the drive torque applied to the epicyclic housing is transmitted to the planet carrier at least partially via the actuating mechanism. The actuating mechanism therefore reacts directly to the rotary torque being transmitted between the epicyclic housing and the planet carrier.

In an example embodiment, the differential is constructed in such a manner that the actuating mechanism has a ramp mechanism. This ramp mechanism can be designed in such a manner that it has rolling elements which roll over angled surfaces. These rolling elements can be constructed as cylindrical rolls, balls, or other rolling bodies, for example, guided in a guide or cage device. The ramp mechanism in this case can have a first ramp ring secured on the epicyclic housing and a second ramp ring secured on the planet carrier. The rolling bodies are then positioned between these ramp rings. Upon a rotation of the two ramp rings, the rolling bodies lift the ramp rings axially apart, and bring the ramp rings closer together when the ramp rings are rotated back ("return").

Other designs of the actuating mechanism are also possible, optionally leaving out the rolling bodies indicated above. As such, the two ramp rings can also be designed in such a manner that they form multiple "tilted" ramp surfaces which are positioned adjacent to each other sequentially around the periphery, with the result that a twisting of the ramp rings in opposite directions leads to the axial expansion of the arrangement and therefore the application of the actuating force.

Instead of the actuating mechanism being constructed in combination with the ramp rings named above, which are made as separate components, it is also possible for the corresponding geometric structures to be molded into corresponding wall regions of the epicyclic housing and the planet carrier. This approach can be implemented in a particularly advantageous manner if the epicyclic carrier, and optionally also the planet carrier, are produced as molded sheet metal components with corresponding axial detail profiling produced by stamping, pressing and/or drawing.

In addition, it is also advantageously possible to design the actuating mechanism in such a manner that the maximum actuation travel of the actuating mechanism is mechanically limited. In the case of the ramp mechanism, limit stop systems can be included which become active when a certain actuation travel is reached, and prevent a further increase in the bridging torque. These limit stop systems can be designed such that the maximum rotary drive torque transmitted between the epicyclic housing and the planet carrier can be transmitted by said limit stop systems with a sufficient safety reserve.

In an example embodiment, the differential is designed in such a manner that the brake disk pack is positioned on a side of the epicyclic housing which faces away from the ramp mechanism. This enables a particularly compact construction of the gearbox.

In an example embodiment, the differential formed by the incorporation of the planet carrier, the planetary arrangement, and the output sun gears is designed as a spur gear differential. The planetary arrangement includes multiple planet gears which as such are mounted on planet pins. Each planet pin can then have a somewhat elongated design and be guided in the planet carrier in a manner allowing axial movement, thereby functioning, as a transmission element which transmits the axial force generated in the ramp mechanism to a pressure plate of the brake disk pack.

In an example embodiment, the brake disk pack itself is designed in such a manner that it has a set of first ring-like brake disks which have a torque-proof engagement with the first output sun gear via an inner edge contour. The brake disk pack also has a set of second brake disks which have a torque-proof engagement with the epicyclic housing via an outer edge contour. The brake disks of these two sets are composed in alternation.

BRIEF DESCRIPTION OF THE FIGURES

Additional details and features of the invention are found in the following description in conjunction with the drawing:

The FIGURE shows an axial cutaway illustration which details the construction of a differential according to the invention. A coupling is made to the epicyclic housing with a friction fit as the drive torque of one of the output sun gear increases, thereby increasing the coupling torque to the epicyclic housing.

DETAILED DESCRIPTION

The illustration in the FIGURE shows a differential according to the invention. In this case, the differential includes gear housing G and epicyclic housing U which is mounted in a manner allowing rotation in gear housing G about gear axis X. Planet carrier 3 is accommodated in epicyclic housing U, also arranged coaxially with gear axis X.

The differential further comprises first output sun gear 1, second output sun gear 2, and planetary arrangement P housed in planet carrier 3, for a coupling of output sun gears 1, 2 in a manner allowing opposite rotation. Brake device 4, which in this case is designed as brake disk pack 4a, 4b, is situated in the differential for the purpose of generating a bridging torque which couples output sun gears 1, 2 with a friction fit according to axial force F applied to brake disk pack 4a, 4b.

In addition, the differential has actuating mechanism 5 for the purpose of generating axial force F applied to brake disk pack 4a, 4b. Actuating mechanism 5 is designed in such a manner that axial force F applied to brake disk pack 4a, 4b increases as the rotary drive torque applied to epicyclic housing U increases.

Brake disk pack 4a, 4b is arranged in such a manner that it couples at least one of output sun gears 1, 2—in this case, the first output sun gear 1—to epicyclic housing U with a friction fit. In this approach, a braking torque is generated which counteracts a relative rotation of output sun gears 1, 2 and therefore couples output sun gears 1, 2 with a friction fit, and in a manner allowing opposite rotation at a corresponding torque load.

Actuating mechanism 5 is designed in such a manner that the maximum locking torque which can be realized is limited to a maximum locking torque value determined by the construction. In this example embodiment, the maximum locking torque value is 15% of the drive torque applied to epicyclic housing U. The differential is constructed in such a manner that the drive torque, the same torque applied to epicyclic housing U, is transmitted to planet carrier 3 via actuating mechanism 5; that is, actuating mechanism 5 functions as a serial transmission member.

Actuating mechanism 5 includes a ramp mechanism with first ramp ring 5a and second ramp ring 5b. Rolling elements 5c are positioned between ramp rings 5a, 5b, rolling on inclined surfaces (not detailed here) formed by ramp rings 5a, 5b. This special construction achieves a configuration wherein ramp rings 5a, 5b are moved axially toward each other upon a relative rotation about gear axis X. The specific design of actuating mechanism 5 in this case are chosen such that, when first ramp ring 5a first rotates with respect to second ramp ring 5b as the result of the rotary drive torque applied to epicyclic housing U, second ramp ring 5b lifts axially away from first ramp ring 5a. The corresponding force is transmitted by rolling elements 5c. The actuating mechanism itself is designed such that the maximum actuating travel of ramp rings 5a, 5b toward each other is limited mechanically. This is achieved by limit stop structures which cannot be seen in further detail here, which as such limit the maximum torsion angle of ramp rings 5a, 5b against each other, and then take over the transmission of rotary torque once ramp rings 5a, 5b become active.

In example embodiment shown in the FIGURE, brake device 4 is positioned on a side of planet carrier 3 which faces away from actuating mechanism 5. The differential formed in this case by the incorporation of planet carrier 3, planetary arrangement P, and output sun gears 1, 2 is designed as a spur gear differential. Planetary arrangement P comprises multiple planet gears P1, P2 which as such are mounted on planet pins 6. Each planet pin 6 can be guided in planet carrier 3 in a manner allowing movement, functioning as a transmission element which transmits axial force F, the same generated by actuating mechanism 5, to brake device 4. Planet pins 6 in this case are fixed to ramp ring 5b.

Brake device 4 has a set of first ring-like brake disks 4a which engage with first output sun gear 1 via an inner edge contour, in a manner allowing axial movement in epicyclic housing U, but engaged with the same in a torque-proof manner. Brake device 4 has a set of second brake disks 4b which have a torque-proof engagement with epicyclic housing U via an outer edge contour, but in a manner allowing axial movement. Although brake device 4 couples first sun gear 1 to epicyclic housing U with a friction fit and in a manner allowing rotation, the braking torque generated as a result also functions between output sun gears 1, 2—that is, it brakes the relative rotations of output sun gears 1, 2 optionally enabled by the differential. Brake device 4 therefore does not directly brake output sun gears 1, 2 against each other, but nonetheless the arrangement of brake device 4 between one of output sun gears 1 or 2 and epicyclic housing U, or planet carrier 3 as well, has the same effect in the end.

First and second planet gears P1, P2 named above, directly engage with each other, and are therefore coupled as a gearing—which will be addressed below in further detail—to each other in such a manner that they rotate in opposite directions. In this example embodiment, there is a total of three planet gears P1 which engage with first output sun gear 1. Planet gears P1 which engage with first output sun gear 1 form a first planet gear set. In addition, there is a total of three planet gears P2 in this embodiment which engage with second output sun gear 2. Planet gears P2 which engage with second output sun gear 2 form a second planet gear set. Each of planet gears P1 of the first set engages with one planet gear P2 of the second set. The engagement of planet gears P1 of the first set with the planet gears P2 of the second set is realized in the same meshing plane as the engagement of planet gears P1 of the first set with first output sun gear 1.

First output sun gear 1 and second output sun gear 2 are matched to each other with respect to the tooth geometry thereof in such a manner that the crown circle of spur gear toothing 1a of first output sun gear 1 is smaller than the root circle of output sun gear toothing 2a of second output sun gear 2. Planet gears P1 of the first set engage with planet gears P2 of the second set in the region of the toothing plane of first output sun gear 1. Output sun gears 1, 2 are therefore directly adjacent to each other.

Output sun gears 1, 2 are designed in such a manner that output sun gear toothing 1a of first output sun gear 1 and output sun gear toothing 2a of second output sun gear 2 have the same tooth counts. Planet gears P1 of the first set and planet gears P2 of the second set also have the same tooth counts. The drive power is routed to the differential via crown wheel 7 and into epicyclic housing U. Power is branched to output sun gears 1, 2 via planet gears P1, P2. Collar sections 1b, 2b are constructed on output sun gears 1, 2. Collar sections 1b, 2b are produced by molding techniques using extrusion, and configured with inner toothing 1c, 2c. End segments of wheel driveshafts, having accordingly complementary toothing, or other power transfer components of the respective wheel drive train, can be inserted into inner toothing 1c, 2c. Instead of the inner toothing shown here, other types of connection geometries can also be contemplated for the transmission of rotary torque and for the purpose of accommodating and centering corresponding components.

Crown wheel 7 is seated on epicyclic housing U in a torque-proof manner. Crown wheel 7 is driven via primary drive pinion 8. Crown wheel 7 and primary drive pinion 8 form an angular gear. The embodiment shown in the FIGURE is therefore particularly suitable as an axle differential for a driven rear axle. In place of the rotary torque application via an angular gear, as shown here, it is also possible to provide a spur gear on epicyclic housing U which is driven, by way of example, via a further spur gear. Such a variant is then particularly suitable for direct installation on a vehicle gearbox in a vehicle with an engine installed transverse thereto—as is particularly common in vehicles with forward engines.

Epicyclic housing U is composed of housing shells U1, U2 produced from a sheet metal material using drawing techniques. Housing shells U1, U2 are connected to each other via connecting bolts. Crown wheel 7 is also secured to epicyclic housing U via these connecting bolts, which are not illustrated here in greater detail. Housing shell U1 forms inner base surface U1a which extends substantially radially, on which is axially supported brake device 4 via annular plate 4c. Second housing shell U2 likewise forms inner base surface U2a on which first ramp ring 5a of actuating mechanism 5 is axially supported. Planet carrier 3 sits between actuating mechanism 5 and brake device 4. The axial force is transmitted in this case via planet pins 6. Planet carrier 3 in this case floats axially on planet pins 6. In a configuration where the entire mechanism allows a slight axial displacement of planet carrier 3 between actuating mechanism 5 and brake device 4, it is also possible for planet pins 6 to be fixed axially in planet carrier 3 and the entire planet carrier to be pressed axially against brake device 4, via actuating mechanism 5, in the manner of a piston. Pins 6 in this case ensure the axial stability of planet carrier 3.

Planet carrier 3 is composed of two carrier shells 3*a*, 3*b* which each are produced as molded sheet metal parts. Carrier shells 3*a*, 3*b* are welded to each other. Struts are constructed on first carrier shell 3*a* for this purpose, as such bridging the toothing region. Carrier shell 3*a* forms an inner bore hole in which a projection of first output sun gear 1 is mounted in a manner allowing rotation. Planet carrier 3 itself is kinematically coupled to epicyclic housing U via actuating mechanism 5. Actuating mechanism 5 determines the maximum torsion angle between planet carrier 3 and epicyclic housing U. In the example shown here, the maximum torsion angle allowed by the actuating mechanism runs up to approx. 20°. It is possible to include further limit stop systems between epicyclic housing U and planet carrier 3, which ultimately ensure that, after a certain actuating travel, planet carrier 3 is reliably moved together with epicyclic housing U. These limit stop systems can be constructed in such a manner that the coupled configuration is reached largely without noise production, and the actuating mechanism is not overloaded. As an alternative, the max. torsion angle can be determined via corresponding limit stop geometries between planet carrier 3 and epicyclic housing U.

Planet carrier 3 is mounted in epicyclic housing U via needle bearing L1. Epicyclic housing U is mounted in gear housing G via angular ball bearings L3, L4. Angular ball bearings L3, L4 also dissipate the radial and axial gear reaction force components, applied to crown wheel 7, into gear housing G. Bearing L1 and also bearing L2 included for the purpose of mounting first sun gear 1 need not dissipate any axial forces. The primary purpose of bearings L1, L2 is to center and mount planet carrier 3, and/or first output sun gear 1, in epicyclic housing U. In particular, bearing L1 can also be implemented as a plain bearing with a bearing bushing, or as a direct bearing of planet carrier 3 in the epicyclic housing. Corresponding seats S1, S2 are constructed on gear housing G, wherein shaft seal rings (not illustrated) can be inserted into the same.

The differential according to the invention functions as follows: Crown wheel 7 is driven via primary drive pinion 8. Crown wheel 7 is fixed to epicyclic housing U in a torque-proof manner. Accordingly, epicyclic housing U is rotated by crown wheel 7. Epicyclic housing U is arranged concentrically to a gear axis X and is mounted in gear housing G via bearings L3, L4.

Together with epicyclic housing U, ramp ring 5*a* of actuating mechanism 5, the former being secured to epicyclic housing U in a torque-proof manner, is also made to rotate. Ramp ring 5*a* moves rolling elements 5*c* of the ramp mechanism along with it. Rolling elements 5*c* in this case are supported on corresponding ramp surfaces of second ramp ring 5*b*, and lift the same away from first ramp ring 5*a* due to the fact that it is fixed in a torque-proof manner with respect to planet carrier 3 and pins 6.

Ramp ring 5*b* is supported axially on the neighboring end faces of planet pins 6, and in turns places a load on the same axially. Planet pins 6 are mounted by the end faces thereof, on the end thereof opposite the actuating mechanism 5, on a thrust collar 4*d*, and in turn place a load on the same axially. Thrust collar 4*d* is a component of a brake device which is constructed in this case as a brake device 4. Brake device 4 is supported axially on an end face U1*a* of the epicyclic housing U via a further thrust collar 4*c*. The brake disk pack engages with first output sun gear 1 and epicyclic housing U, and couples these two organs with a friction fit according to the magnitude of axial force F applied to the brake disk pack. Axial force F is in turn determined by the drive torque applied to epicyclic housing U. Actuating mechanism 5 can be designed in such a manner that there is a substantially linear relationship between the drive torque and the axial actuating force. By means of a corresponding structural design of actuating mechanism 5, as well as the installation of reset organs, such as reset springs, it is also possible to realize markedly non-linear relationships between the drive torque and the braking torque. The entire mechanism can particularly be constructed in such a manner that a frictional bridging torque is only generated once a minimum torque is exceeded, and that bridging torque also only reaches a maximum absolute value, or only a maximum absolute fraction of the primary drive torque.

The invention is not restricted to the embodiment described herein. It is also possible to configure brake disk packs on both sides of the planet carrier, and to thereby also couple the second output sun gear to epicyclic housing U with a friction fit. Actuating mechanism 5 can also be arranged directly on the side of brake device 4. In a configuration where two brake disk packs are installed, the actuating mechanism can also be included "double" in the design—meaning that a dedicated actuating mechanism can be functionally assigned to each brake disk pack. Brake device 4 can also be incorporated in the construction of the differential in such a manner that it couples an output sun gear 1, 2 to planet carrier 3 with a friction fit. Brake device 4 can also be arranged axially between output sun gears 1, 2, and can directly couple output sun gears 1, 2 to each other with a friction fit, wherein in this variant as well the mechanism as a whole is designed in such a manner that the coupling torque, as a friction torque, increases as the load torque applied to the epicyclic housing increases.

The epicyclic gearing accommodated in this case in epicyclic housing U forms, as mentioned above, a spur gear differential. In the embodiment shown here, output sun gears 1, 2 and planet gears P1, P2 of planetary arrangement P have a Wildhaber-Novikov toothing. First output sun gear 1 in this case has a toothing with a small crown circle and concave tooth flank surfaces. Second output sun gear 2 has a toothing with a large crown circle and convex tooth flank surfaces. The crown circle diameter of first output sun gear 1 and theoretical root circle of the second output sun gear approximately correspond to the pitch circle. Both gears 1, 2 have the same tooth counts. First output sun gear 1 engages with planets P1, second output sun gear 2 engages with planets P2. Planets P1 have a greater crown circle diameter and form convex tooth flanks. Planets P2 have a small crown circle diameter and form concave tooth flanks. Planet gears P1, P2 engage in pairs with each other. The engagement occurs in the plane of engagement of first planet gears P1 with first output sun gear 1. First planet gears P1 have an axial length which substantially corresponds to the axial length of toothing 1*a* of first output sun gear 1. Second planet gears P2 have an axial length which substantially corresponds to the sum of the axial lengths of toothings 1*a*, 2*a* of output sun gears 1, 2.

First output sun gear 1 in this case forms an integral component of a component which itself is more complex, and which particularly forms inner toothing 1*c* included for the purpose of receiving the insert shaft, a bearing surface for the purpose of receiving needle bearing L2, and also an outer toothing to carry brake disks 4a in a torque-proof manner allowing axial movement. The implementation of the corresponding functional geometries on a single component offers advantages from the perspective of production techniques. With respect to the assembly thereof as well, the construction shown here is also advantageous. For example, brake device 4, together with two pressure plates 4c, 4d, is inserted first into epicyclic housing shell U1. Then the differential gear subunit, previously assembled, is inserted into epicyclic housing shell U1. This differential gear subunit includes output sun gears 1, 2, planet carrier 3, planet gears P1, P2, and planet pins 6. Next, actuating mechanism 5, likewise pre-assembled, is installed, then epicyclic housing shell U2. Needle bearings L1, L2 can now be inserted axially. It is also possible to place needle bearings L1, L2 on planet pins 3 and/or the output sun gear 1 in advance. Crown wheel 7 is placed on the component assembly formed in this way, and is bolted to epicyclic housing U. This assembly is inserted into gear housing G via angular ball bearings L3, L4.

The differential according to the invention can be used as a differential for high-output drive systems. The toothing of the spur gears of the inner epicyclic gearing is designed as described above as a Wildhaber-Novikov toothing with low radial constructed space. The differential according to the invention is particularly suitable as a rear wheel differential. The disk clutch is positioned between the differential sun gear and the carrier of the hypoid gear. The actuating mechanism which actuates the disk clutch is designed as a torque-sensing ramp actuator. In the embodiment shown, this is an essentially serial construction with molded sheet metal parts and a ramp actuator with only three rollers.

In the differential according to the invention, two opposing ramps are rotated opposite each other as a result of rotation of the outer housing with respect to the inner differential. The three rollers arranged between the ramps in this case provide the high possible degree of efficiency. The rotary movement is converted into a translation movement. This generates an axial force on the housing and the bolts of the differential. The disk clutch is pressed together. As a result, the sun gear of the differential is locked with respect to the housing.

The invention fundamentally relates to a torque-sensing limited slip differential with a ramp actuator which generates an axial actuating force for a coupling according to the drive torque on the crown wheel. This coupling brakes or locks the sun gear with respect to the differential gear and enables a braking or locking function of the axle up to 100% if necessary. In the embodiment shown, a spur gear differential is used which has Wildhaber-Novikov toothing (a Schaeffler heavy duty differential).

The invention claimed is:
1. A differential, comprising:
a gear housing;
an epicyclic housing which is mounted in the gear housing in a manner allowing rotation about a gear axis;
a planet carrier arranged in the epicyclic housing in a manner allowing rotation;
a first output sun gear;
a second output sun gear;
a planetary arrangement, accommodated in the planet carrier, for the purpose of coupling the first and second output sun gears in a manner allowing opposite rotation;
a brake device arranged on a first axial end of the planet carrier for the purpose of generating a first bridging torque which places a load on relative rotation of the first and second output sun gears, according to a magnitude of an axial force applied to the brake device; and,
an actuating mechanism arranged on a second axial end of the planet carrier for the purpose of generating said axial force applied to the brake device, wherein the actuating mechanism is designed in such a manner that the first bridging torque generated by the brake device increases as a rotary drive torque applied to the epicyclic housing increases.

2. The differential according to claim 1, wherein the brake device has a brake disk pack for the purpose of generating the first bridging torque which couples the first and second output sun gears with a first friction fit according to the axial force applied to the brake disk pack.

3. The differential according to claim 2, wherein the brake disk pack is arranged in such a manner that the brake disk pack couples at least one of the first or second output sun gears to the epicyclic housing with the first friction fit.

4. The differential according to claim 2, wherein the brake disk pack is arranged in such a manner that it couples at least one of the first or second output sun gears to the planet carrier.

5. The differential according to claim 1, wherein the actuating mechanism is designed in such a manner that a maximum locking torque which is realized is limited by a maximum locking torque value determined by construction of the actuating mechanism.

6. The differential according to claim 1, wherein the rotary drive torque applied to the epicyclic housing is transmitted to the planet carrier via said actuating mechanism.

7. The differential according to claim 1, wherein:
the actuating mechanism has a ramp mechanism;
the ramp mechanism has rolling elements which roll over inclined surfaces; and,
the maximum actuation path of the actuating mechanism is limited mechanically.

8. The differential according to claim 7, wherein a brake disk pack is positioned on a side of the epicyclic housing which faces away from the ramp mechanism.

9. The differential according to claim 1, wherein:
the differential is formed by the incorporation of the planet carrier and the planetary arrangement;
the output sun gears are designed as a spur gear differential;
the planetary arrangement comprises multiple planet gears which as such are mounted on planet pins; and,
each planet pin is guided in the planet carrier in a manner:
 allowing axial movement; and,
 functioning as a transmission element which transmits the axial force, generated by a ramp mechanism, to a brake disk pack.

10. The differential according to claim 1, wherein:
a brake disk pack has a set of first ring-like brake disks which have a torque-proof engagement with the first output sun gear via an inner edge contour; and,
the brake disk pack has a set of second brake disks which have a torque-proof engagement with the epicyclic housing via an outer edge contour.

11. The differential according to claim 1, wherein:
the actuating mechanism has a ramp mechanism;
the ramp mechanism has rolling elements which roll over inclined surfaces; or, the maximum actuation path of the actuating mechanism is limited mechanically.

\* \* \* \* \*